(12) United States Patent
Wu et al.

(10) Patent No.: US 11,513,681 B2
(45) Date of Patent: Nov. 29, 2022

(54) METHOD, DEVICE, AND COMPUTER PROGRAM PRODUCT FOR MANAGING STORAGE SYSTEM

(71) Applicant: EMC IP Holding Company LLC, Hopkinton, MA (US)

(72) Inventors: Zhilong Wu, Beijing (CN); Haiying Tang, Beijing (CN); Xinlei Xu, Beijing (CN); Rongrong Shang, Beijing (CN); Xiaobo Zhang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 21 days.

(21) Appl. No.: 16/890,402

(22) Filed: Jun. 2, 2020

(65) Prior Publication Data

US 2021/0124490 A1    Apr. 29, 2021

(30) Foreign Application Priority Data

Oct. 28, 2019    (CN) .......................... 201911031260.4

(51) Int. Cl.
     *G06F 3/06*      (2006.01)
(52) U.S. Cl.
     CPC .......... *G06F 3/0604* (2013.01); *G06F 3/0629* (2013.01); *G06F 3/0689* (2013.01)
(58) Field of Classification Search
     CPC ........ G06F 3/06; G06F 3/0604; G06F 3/0629; G06F 3/0689

USPC ........................................................ 711/154
See application file for complete search history.

(56) References Cited

U.S. PATENT DOCUMENTS

| | | | |
|---|---|---|---|
| 10,140,041 B1 | 11/2018 | Dong et al. | |
| 10,445,013 B2 | 10/2019 | Lei et al. | |
| 10,592,366 B2 | 3/2020 | Gao et al. | |
| 2011/0197024 A1* | 8/2011 | Thomas | G06F 3/0631 711/114 |
| 2019/0235957 A1* | 8/2019 | Li | G06F 3/0689 |
| 2020/0026467 A1 | 1/2020 | Kang et al. | |
| 2020/0133536 A1 | 4/2020 | Dong et al. | |
| 2020/0133810 A1 | 4/2020 | Gao et al. | |

* cited by examiner

*Primary Examiner* — Michael Krofcheck
(74) *Attorney, Agent, or Firm* — BainwoodHuang

(57) ABSTRACT

A storage system comprises stripes, extents comprised in one stripe among the stripes residing on storage devices in the storage system, respectively. A failed stripe is determined among the stripes, the failed stripe comprising a group of failed extents residing on a group of failed storage devices, respectively, a number of failed storage devices in the group being less than or equal to parity width of the storage system. Distribution of the group of failed extents in the failed stripe is obtained. A rebuild parameter for rebuilding data in the failed stripe is generated based on the obtained distribution. The generated rebuild parameter is stored for rebuilding the storage system. Accordingly, a rebuild parameter generated for one failed stripe is reused for other failed stripe with the same distribution. The performance of rebuild operations may be improved, and time of rebuild operations may be reduced.

15 Claims, 10 Drawing Sheets

METHOD, DEVICE, AND COMPUTER PROGRAM PRODUCT FOR MANAGING STORAGE SYSTEM

CROSS-REFERENCE TO RELATED APPLICATION

This application claims priority to Chinese Patent Application No. CN201911031260.4, on file at the China National Intellectual Property Administration (CNIPA), having a filing date of Oct. 28, 2019, and having "METHOD, DEVICE, AND COMPUTER PROGRAM PRODUCT FOR MANAGING STORAGE SYSTEM" as a title, the contents and teachings of which are herein incorporated by reference in their entirety.

FIELD

Various implementations of the present disclosure relate to storage management, and more specifically, to a method, device and computer program product for building a storage system when a storage device in the storage system fails.

BACKGROUND

With the development of data storage technology, various data storage devices now provide users with increasingly large data storage capability, and also their data access speed has been greatly increased. With the increase of data storage capability, users also impose higher demands on data reliability and response time of storage systems. So far various data storage systems based on redundant arrays of independent disks (RAID) have been developed to improve data reliability. When one or more disks in a storage system fail(s), data in failed disk(s) can be recovered from other normal disk(s).

A mapped Redundant Array of Independent Disks (mapped RAID) has been developed. In this mapped RAID, a disk is a logical concept and may include a plurality of extents. Extents comprised in one logical disk may be distributed across different physical storage devices in a resource pool. For a plurality of extents in one stripe of the mapped RAID, these extents are supposed to be distributed across different physical storage devices, so that when a physical storage device where one extent among the plurality of extents resides fails, a rebuild operation may be performed to recover data from a physical storage device where another extent resides.

Due to difference in usage state and time when each storage device comes into service in the resource pool, one or more storage devices might fail, and data in failed storage devices needs to be rebuilt. A rebuild operation will involve a complex computing process. In particular, in a storage system with two or more parity data, when two or more storage devices fail, the rebuild operation will take many computing resources. At this point, it has become a difficult technical problem regarding how to perform the rebuild operation in a more effective way.

SUMMARY

Therefore, it is desirable to develop and implement a technical solution for rebuilding a storage system more effectively. It is desired that the technical solution be compatible with an existing application system to manage a storage system more effectively by reconstructing configurations of the existing storage system.

According to a first aspect of the present disclosure, a method is provided for managing a storage system. The storage system includes a plurality of stripes, a plurality of extents comprised in one stripe among the plurality of stripes residing on a plurality of storage devices in the storage system, respectively. In the method, a failed stripe is determined among the plurality of stripes, the failed stripe including a group of failed extents residing on a group of failed storage devices, respectively, the number of failed storage devices in the group being less than or equal to parity width of the storage system. Distribution of the group of failed extents in the failed stripe is obtained. A rebuild parameter for rebuilding data in the failed stripe is generated based on the obtained distribution. The generated rebuild parameter is stored for rebuilding the storage system.

According to a second aspect of the present disclosure, a device is provided for managing a storage system. The storage system includes a plurality of stripes, a plurality of extents comprised in one stripe among the plurality of stripes residing on a plurality of storage devices in the storage system, respectively. The device includes: at least one processor; and a memory coupled to the at least one processor, the memory having instructions stored thereon, the instructions, when executed by the at least one processor, causing the device to perform acts. The acts include: determining a failed stripe among the plurality of stripes, the failed stripe including a group of failed extents residing on a group of failed storage devices, respectively, the number of failed storage devices in the group being less than or equal to parity width of the storage system; obtaining distribution of the group of failed extents in the failed stripe; generating a rebuild parameter for rebuilding data in the failed stripe based on the obtained distribution; and storing the generated rebuild parameter for rebuilding the storage system.

According to a third aspect of the present disclosure, a computer program product is provided. The computer program product is tangibly stored on a non-transitory computer-readable medium and includes machine-executable instructions which are used to implement a method according to the first aspect of the present disclosure.

BRIEF DESCRIPTION OF THE DRAWINGS

Through the more detailed description in the accompanying drawings, features, advantages and other aspects of the implementations, the present disclosure will become more apparent. Several implementations of the present disclosure are illustrated schematically and are not intended to limit the present invention. In the drawings.

DETAILED DESCRIPTION OF IMPLEMENTATIONS

Figure 1A:
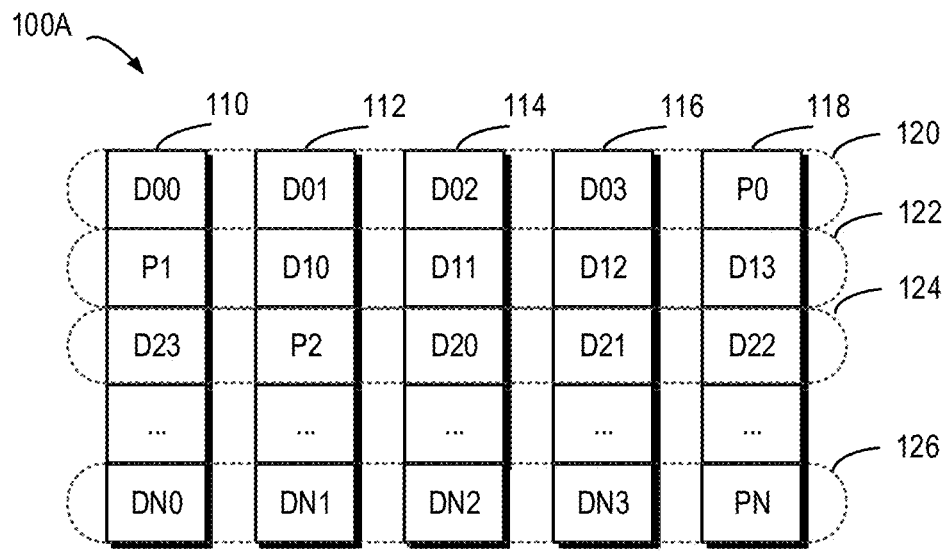
FIGS. 1A and 1B each show a block diagram of a storage system in which a method of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred implementations of the present disclosure will be described in more detail with reference to the drawings. Although the drawings illustrate the preferred implementations of the present disclosure, it should be appreciated that the present disclosure can be implemented in various ways and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text can also include other explicit and implicit definitions.

In the context of the present disclosure, the storage system may be a RAID-based storage system. The RAID-based storage system may combine a plurality of storage devices into an array of disks. By providing redundant storage devices, reliability of an entire disk group is caused to significantly exceed a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc. For more details about RAID levels, those skilled in the art may refer to https://en.wikipedia.org/wiki/Standard_RAID_levels and https://en.wikipedia.org/wiki/Nested_RAID_levels, etc.

FIG. 1A schematically illustrates a schematic view of a storage system 100A in which a method of the present disclosure may be implemented. In the storage system shown in FIG. 1A, working principles of RAID are illustrated by taking a RAID-5 (4D+1P, where 4D represents that 4 storage devices are included in the storage system for storing data, and 1P represents that 1 storage device is included in the storage system for storing parity) array that consists of five independent storage devices (110, 112, 114, 116 and 118) as an example. It should be noted that although five storage devices are schematically shown in FIG. 1A, in other implementations more or less storage devices may be comprised according to different levels of RAID. Moreover, although FIG. 1A illustrates stripes 120, 122, 124, . . . , 126, in other examples the RAID system may further include a different number of stripes.

In RAID, a stripe may cross a plurality of physical storage devices (for example, the stripe 120 crosses the storage devices 110, 112, 114, 116 and 118). The stripe may be simply construed as a storage area among a plurality of storage devices which satisfies a given address range. Data stored in the stripe 120 includes a plurality of parts: a data extent D00 stored in the storage device 110, a data extent D01 stored in the storage device 112, a data extent D02 stored in the storage device 114, a data extent D03 stored in the storage device 116, and a data extent PO stored in the storage device 118. In this example, the data extents D00, D01, D02 and D03 are stored data, and the data extent PO is a P parity of the stored data.

The mode of storing data in other stripes 122 and 124 is similar to that in the stripe 120, the difference is that the parity about other data block may be stored in another storage device than the storage device 118. In this way, when one of the plurality of storage devices 110, 112, 114, 116 and 118 fails, data in the failed device may be recovered from other normal storage devices.

Figure 1B:
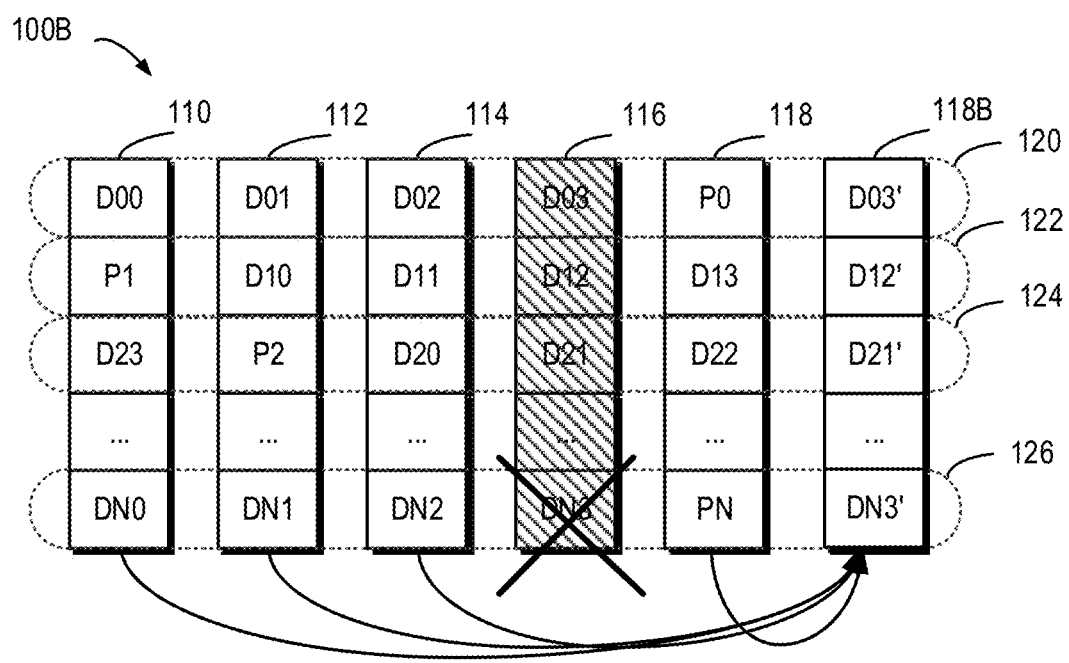

FIG. 1B schematically illustrates a schematic view 100B of rebuilding process of the storage system 100A. As shown in FIG. 1B, when one storage device (e.g., the shaded storage device 116) fails, data may be recovered from the other storage devices 110, 112, 114 and 118 that operate normally. At this point, a new backup storage device 118B may be added to RAID to replace the storage device 118. In this way, recovered data may be written to 118B, and system rebuilding may be realized.

Note while a RAID-5 storage system including 5 storage devices (among which 4 storage devices are used for storing data and 1 storage device is used for storing parity) has been described with reference to FIGS. 1A and 1B, according to the definition of other RAID levels, there may further exist a storage system including a different number of storage devices. On the basis of the definition of RAID-6, for example, two storage devices may be used to store parity P and Q, respectively. In another example, according to the definition of triple-parity RAID, three storage devices may be used to store parity P, Q and R, respectively.

Figure 2:
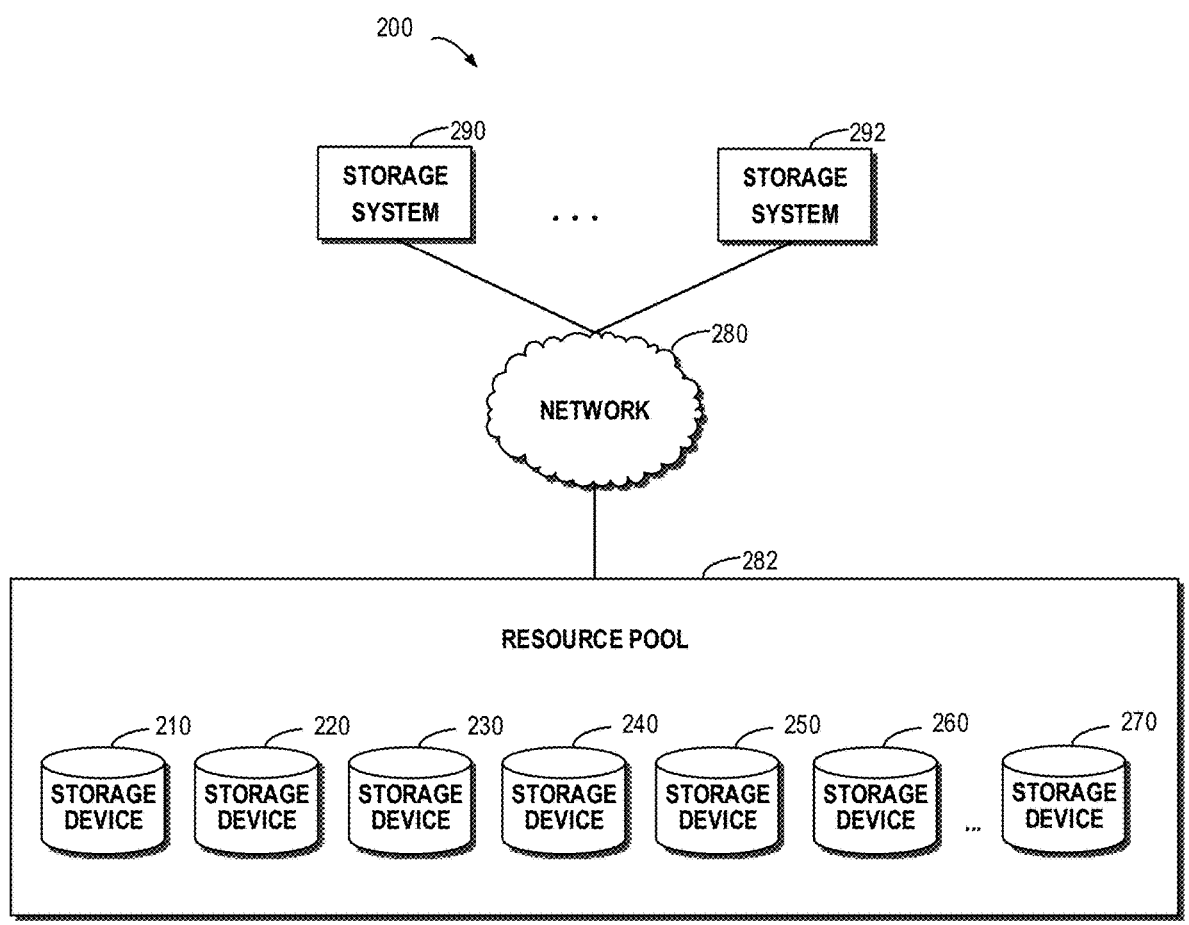
FIG. 2 schematically shows a block diagram of an example environment in which a method of the present disclosure may be implemented.

With the development of distributed storage technologies, the various storage devices 110, 112, 114, 116 and 118 in the storage system shown in FIGS. 1A and 1B may no longer be limited to physical storage devices but may be virtual storage devices. For example, respective extents on the storage device 110 may come from different physical storage devices (hereinafter referred to as storage devices for short) in the resource pool. FIG. 2 schematically shows a block diagram of an example environment 200 in which the method of the present disclosure may be implemented. As depicted, a storage resource pool 282 may include a plurality of physical storage devices 210, 220, 230, 240, 250, . . . , 260. At this point, storage space in the plurality of storage devices may be allocated to a plurality of storage systems 290, . . . , 292. At this point, these storage systems 290, . . . , 292 may access the storage space in the various storage devices in the storage resource pool 282 via a network 280.

It will be understood that when a storage device in the storage system fails, data in the failed storage device may be rebuilt based on an XOR operation. At this point, a rebuild operation has lower complexity. Without data loss, when two storage devices in the storage system (e.g., 4D+1P+1Q storage system or 4D+1P+1Q+1R storage system) fail, then a rebuild operation involves higher complexity.

Schematic implementations of the present disclosure will be described under an application environment that is a 4D+1P+1Q storage system. For example, in a RAID-6 storage system, the complexity of a rebuild operation is $O(n^3)$, wherein n is data width in the storage system. For example, data width in a 4D+1P+1Q storage system is 4, so the complexity of a rebuild operation is 64; data width in a 8D+1P+1Q storage system is 8, so the complexity of a rebuild operation is 512; while data width in a 16D+1P+1Q storage system is 16, so the complexity of a rebuild operation is 4096. At this point, it has become an urgent problem regarding how to perform a rebuild operation in a more effective way.

Figure 3:
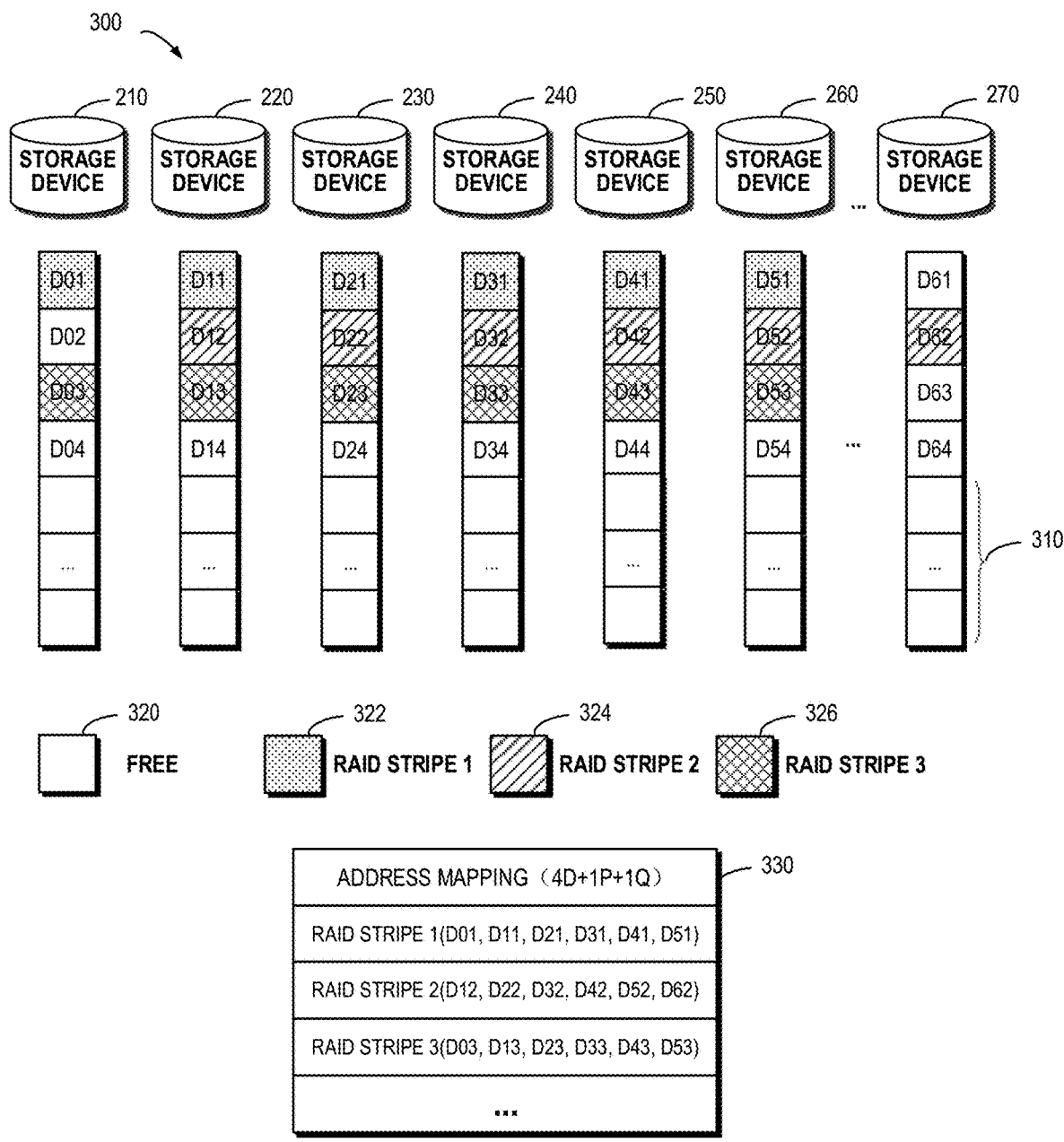
FIG. 3 schematically shows a diagram of a storage resource pool in FIG. 2.

FIG. 3 schematically shows a diagram of more information of the storage resource pool 282 as shown in FIG. 2. The resource pool 282 may include a plurality of storage devices 210, 220, 230, 240, 250, 260, . . . , 270. Each storage device may include a plurality of extents, where a legend 320 represents a free extent, a legend 322 represents an extent for RAID stripe 1 of the storage system, a legend 324 represents an extent for RAID stripe 2 of the storage system, and a legend 326 represents an extent for stripe 3 of the storage system. At this point, extents D11, D22, D33 and D44 for RAID stripe 1 are used for storing data extents of the stripe, respectively, and extents D41 and D51 are used for storing parity P and parity Q, respectively. Extents D12, D22, D32 and D42 for RAID stripe 2 are used for storing data extents of the stripe, respectively, and extents D42 and D62 are used for storing parity P and parity Q, respectively.

As shown in FIG. 3, an address mapping 330 shows associations between a stripe and addresses of extents in the stripe. For example, RAID stripe 1 may include 6 extents, namely D01, D11, D21, D31, D41 and D51, which reside on the storage devices 210, 220, 230, 240, 250 and 260, respectively. As shown in FIG. 3, specifically, extent D01 is the first extent in the storage device 210, and extent D11 is the first extent in the storage device 220. As shown in FIG. 3, there may exist a reserved spare portion 310 in each storage device, so that when a storage device in the resource pool fails, an extent in the spare portion 310 in each storage device may be selected to rebuild various extents in the failed storage device.

Note in FIG. 3 the 4D+1P+1Q RAID-6 storage system is taken as an example to illustrate how extents in various stripes are distributed over a plurality of storage systems in the resource pool. When RAID based on another level is employed, those skilled in the art may implement concrete details on the basis of the above described principles. For example, in the 8D+1P+1Q RAID-6 storage system, 8 extents in each stripe may be evenly distributed over 8 storage devices so as to ensure a load balance between the plurality of storage devices.

It will be understood with the use of the storage system, one or more storage devices among the plurality of storage devices might fail, at which point a rebuild operation needs to be started so as to recover data in failed storage device(s) to normal storage device(s) for the purpose of avoiding data loss. Technical solutions for building a storage system have been proposed. Specifically, regarding a failed stripe including two failed storage devices, a rebuild parameter for rebuilding the failed stripe may be generated based on locations of failed devices in the stripe. However, when the storage system includes a large number of to-be-rebuilt stripes, a corresponding rebuild parameter has to be generated for each stripe one by one, and a rebuild may be performed.

Although the above technical solution can rebuild failed stripes in the storage system, the technical solution takes a relatively long time. If a third failed storage device arises during a rebuild, then unrecoverable data loss will occur in the 4D+1P+1Q storage system. Therefore, it is desirable to improve the performance of the rebuild operation and reduce the time of the rebuild operation as much as possible.

To solve the above drawbacks, implementations of the present disclosure provide a method, device and computer program product for managing a storage system. Concrete implementations of the present disclosure will be described in detail below. According to one implementation of the present disclosure, a method is provided for managing a storage system. In the method, a concept of a distribution of failed extents is introduced. If failed extents in two failed stripes are distributed in the same way, then the two failed stripes may share the same rebuild parameter. In other words, a rebuild parameter for one failed stripe may be used for the other failed stripe.

With example implementations of the present disclosure, it is unnecessary to generate a rebuild parameter for each failed stripe including a failed extent one by one, but a generated rebuild parameter may be obtained directly. Regarding a given type of storage system, the number of types of the distribution of failed extents is rather limited, so only a limited number of rebuild parameters needs to be generated and stored, and the stored rebuild parameters may be used to rebuild the storage system. With example implementations of the present disclosure, on the one hand, overheads of unnecessary computing resources and time resources for repetitively generating rebuild parameters may be avoided. On the other hand, the process of the rebuild operation may be shortened greatly, the possibility that another storage device fails during a rebuild may be reduced, and further the reliability of the storage system may be improved.

Figure 4:
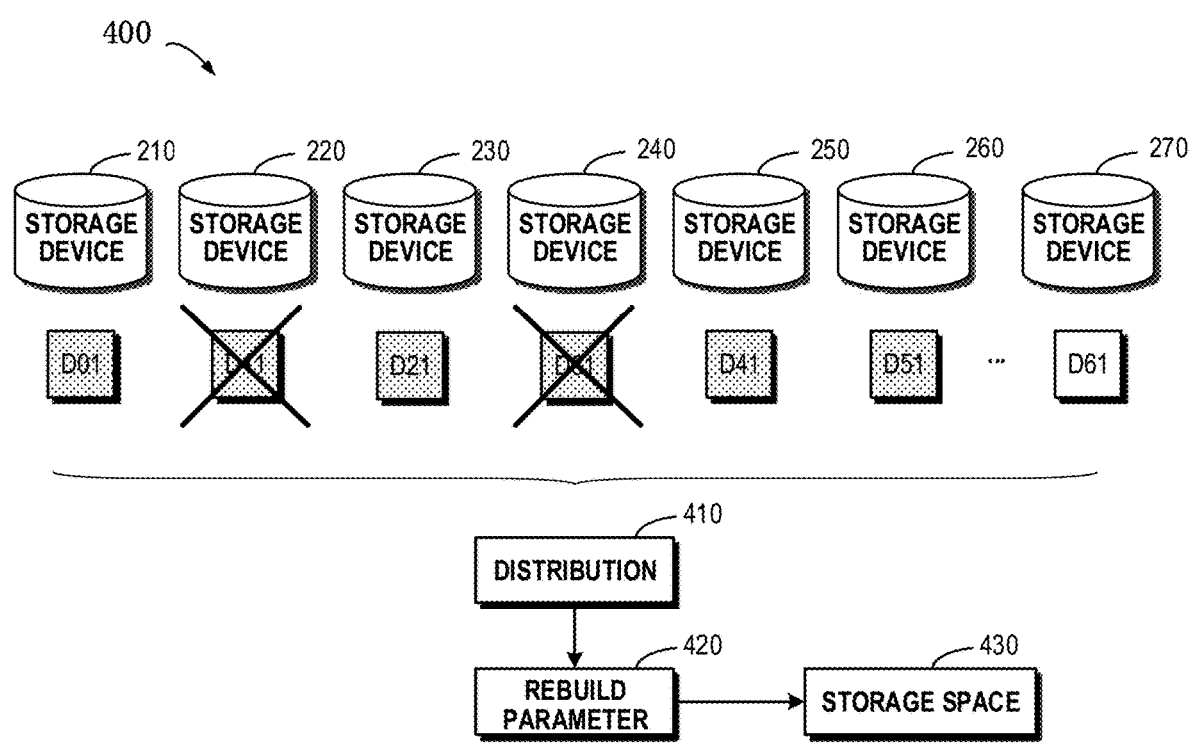
FIG. 4 schematically shows a block diagram of the process for managing a storage system according to example implementations of the present disclosure.

With reference to FIG. 4, a brief description is presented of the process of implementations of the present disclosure. FIG. 4 schematically shows a block diagram 400 of the process for managing a storage system according to example implementations of the present disclosure. As depicted, RAID stripe 1 in the storage system may include 6 extents, i.e., D01, D11, D21, D31, D41 and D51, among which the first four extents are used to store data while the last two extents are used to store parity. The six extents reside on storage devices 210, 220, 230, 240, 250 and 260, respectively. Suppose the storage devices 220 and 240 fail, then at this point since the extents D11 and D31 reside on the failed storage devices 220 and 240, respectively, the extents D11 and D31 are failed extents, and RAID stripe 1 is a failed stripe.

At this point a group of failed extents consist of two failed extents D11 and D31, and a distribution 410 of the failed extents D11 and D31 in the failed stripe may be determined. Suppose the 6 extents in the stripe are marked in a sequence from 0 to 5, then the failed extents D11 and D31 are the $1^{st}$ and $3^{rd}$ extents in the stripe, respectively. The distribution of the failed extents may be recorded as (1, 3), indicating that devices on which the first and third extents in the stripe reside fail and that data in the first and third extents needs to be recovered.

As shown in FIG. 4, a rebuild parameter 420 may be generated for RAID stripe 1, and subsequently the rebuild parameter 420 may be stored in storage space 430 for rebuilding the storage system. It will be understood that the stored rebuild parameter 420 may not only be used to rebuild RAID stripe 1 in the storage system but also may be used to rebuild another failed stripe with the same distribution as RAID stripe 1. Returning to FIG. 3, RAID stripe 3 includes extents D03, D13, D23, D33, D43 and D53. Since a distribution of failed extents in RAID stripe 3 is identical to the distribution of failed extents in RAID stripe 1, the two stripes may share the same rebuild parameter. With example implementations of the present disclosure, the rebuild parameter only needs to be generated for one stripe, so the efficiency of the rebuild operation may be improved greatly.

Figure 5:
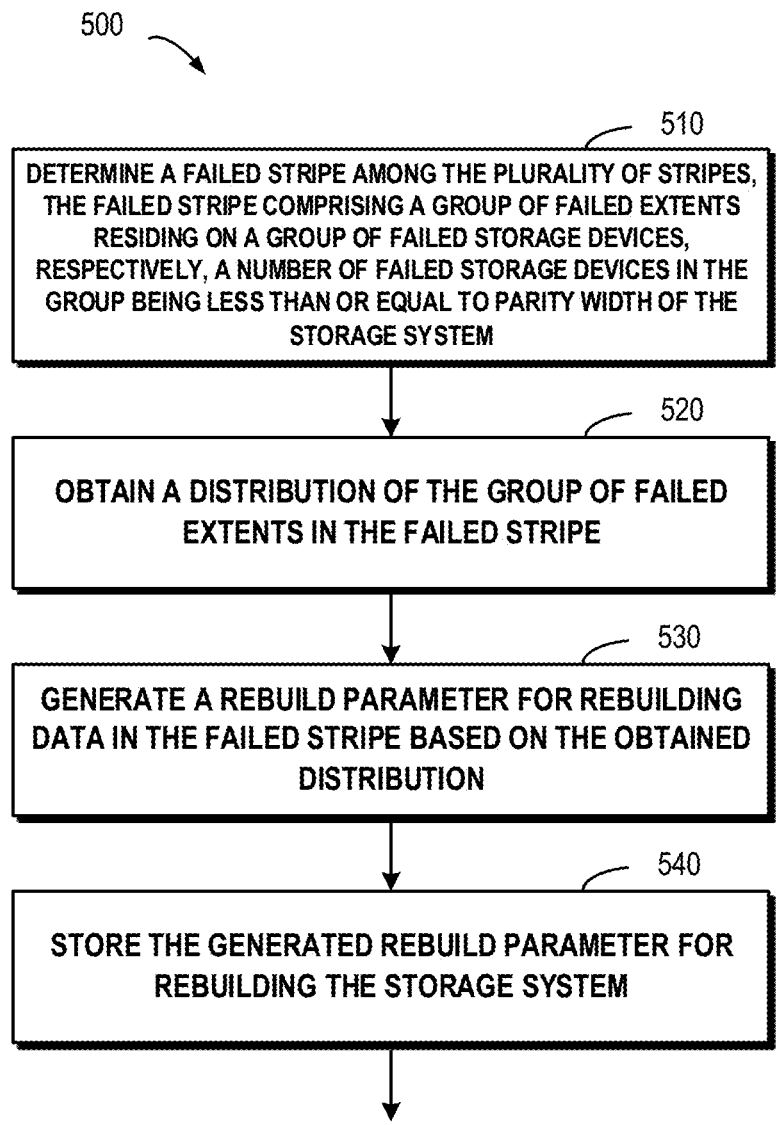
FIG. 5 schematically shows a flowchart of a method for managing a storage system according to example implementations of the present disclosure.

With reference to FIG. 5, description is presented in more detail about a method for managing a storage system. FIG. 5 schematically shows a flowchart of a method 500 for managing a storage system according to example implementations of the present disclosure. Here the storage system may include a plurality of stripes, and a plurality of extents in one stripe among the plurality of stripes reside on a plurality of storage devices in the storage system, respectively. When a storage device among the plurality of storage devices fails, the method 500 according to example implementations of the present disclosure may be started. Specifically, the method 500 may be started when the number of failed storage devices is equal to parity width of the storage system.

According to example implementations of the present disclosure, the data width of the storage system refers to the number of data extents in one stripe, and the parity width of the storage system refers to the number of parity extents in one stripe. For example, in a 4D+1P+1Q storage system, the data width is 4, and the parity width is 1+1=2; in an 8D+1P+1Q storage system, the data width is 8, and the parity width is 2.

At block 510, a failed stripe among the plurality of stripes is determined, and the failed stripe includes a group of failed extents residing on a group of failed storage devices, respectively. Here the number of storage devices in the group is less than or equal to parity width of the storage system. For example, in a 4D+1P+1Q storage system, a stripe including extents residing on two failed storage devices may be found in the plurality of stripes. It will be understood the method 500 may be used to rebuild a stripe including 2 failed extents, while for a stripe including only 1 failed extent, an XOR operation may be used to rebuild data in the failed extent based on an existing method. For another example, in a storage system based on triple parity, the method 500 may further be applied when 2 or 3 failed storage devices arise in the storage system.

At block 520, distribution of the group of failed extents in the failed stripe is obtained. Specifically, the distribution may be determined based on locations of the group of failed extents in the failed stripe. Returning to the example of FIG. 3, RAID stripe 2 includes extents D12, D22, D32, D42, D52 and D62. Where the storage devices 220 and 240 fail, extents D12 and D32 are failed extents (the $0^{th}$ and $2^{nd}$ extents in the stripe, respectively). Thereby, the distribution in RAID stripe 2 is (0, 2).

At block 530, a rebuild parameter for rebuilding data in the failed stripe is generated based on the obtained distribution. According to example implementations of the present disclosure, the rebuild parameter may be generated in the following way. Description is presented below with reference to RAID stripe 1, here the distribution is (1, 3). First of all, an original matrix A may be built, the matrix including n columns of data (n is data width of the storage system) and n+m rows of data (m is parity width of the storage system). Therefore, in a 4D+1P+1Q storage system, the original matrix A may be represented as below:

$$\text{original matrix } A = \begin{pmatrix} 1 & 0 & 0 & 0 \\ 0 & 1 & 0 & 0 \\ 0 & 0 & 1 & 0 \\ 0 & 0 & 0 & 1 \\ p1 & p2 & p3 & p4 \\ q1 & q2 & q3 & q4 \end{pmatrix}$$

The original matrix A includes two portions: the upper 4×4 matrix is a diagonal matrix, and two rows in the lower 4×2 matrix include parity p1-p4 and q1-q4 in parity extents, respectively. Since the $1^{st}$ and $3^{rd}$ extents in RAID stripe 1 are failed extents, the $1^{st}$ and $3^{rd}$ rows may be removed from the original matrix A to form an intermediate matrix B.

$$\text{intermediate matrix } B = \begin{pmatrix} 1 & 0 & 0 & 0 \\ 0 & 0 & 1 & 0 \\ p1 & p2 & p3 & p4 \\ q1 & q2 & q3 & q4 \end{pmatrix}$$

Subsequently, an inverse matrix C of the intermediate matrix may be obtained through an inverse operation. The process of the inverse operation is omitted here, and the inverse matrix C may be represented as below. Data in failed extents with distribution (1, 3) may be recovered using the inverse matrix C. Thereby, a rebuild parameter may include the inverse matrix C. It will be understood here the process for generating the inverse matrix C and the process for recovering data in the failed stripe based on the inverse matrix C are the same as in the prior art and thus are not detailed here.

$$\text{inverse matrix } C = \begin{pmatrix} a & b & c & d \\ x1 & x2 & x3 & x4 \\ e & f & g & h \\ y1 & y2 & y3 & y4 \end{pmatrix}$$

At block 540, the generated rebuild parameter may be stored for rebuilding the storage system. Specifically, the inverse matrix C may be used to rebuild the storage system and thus is stored in storage space. It will be understood that an example of generating the rebuild operation for the stripe with the distribution (1, 3) has been presented for the purpose of illustration, and when failed extents reside elsewhere, a corresponding rebuild parameter may further be generated. For example, regarding RAID stripe 2 as shown in FIG. 3, a distribution of failed extents in the stripe is (2, 2). At this point, rows corresponding to the distribution of failed extents may be removed from the original matrix A, and an intermediate matrix B' may be generated based on a similar method. Further, an inverse matrix C' for rebuilding RAID stripe 2 may be generated based on the intermediate matrix B'. At this point, the generated inverse matrix C' may be used to rebuild data in the stripe with the distribution (0, 2).

$$\text{intermediate matrix } B' = \begin{pmatrix} 0 & 1 & 0 & 0 \\ 0 & 0 & 0 & 1 \\ p1 & p2 & p3 & p4 \\ q1 & q2 & q3 & q4 \end{pmatrix}$$

According to example implementations of the present disclosure, a corresponding failed stripe may be rebuilt using a rebuild parameter generated for a different distribution. Specifically, a group of free extents may be selected from a group of normal storage devices other than the group of failed storage devices among the plurality of storage devices. To rebuild RAID stripe 1, two free extents may be selected from normal storage devices in the resource pool. It will be understood that the free extents selected here are supposed to reside on storage devices other than various storage devices in the failed stripe. Subsequently, data in the group of failed extents may be rebuilt to the selected group of free extents based on the stored rebuild parameter. For example, data in RAID stripe 1 may be rebuilt using the inverse matrix C, and data in RAID stripe 2 may be rebuilt using the inverse matrix C'.

According to example implementations of the present disclosure, since a load balance among the plurality of storage devices needs to be guaranteed, preferably free extents may be selected from storage devices with lower workloads. Specifically, workloads of the group of storage devices may be determined first. Here the workload may include various respects. For example, the workload of a storage device may be determined based on storage space used in the storage device. Alternatively and/or additionally, the workload may further be determined based on processing resources, bandwidth and other states of the storage device. A predetermined condition may be set, e.g., a storage device with the lowest workload may be selected. Alternatively and/or additionally, the predetermined condition may further include selecting a storage device with a lower workload. A storage device with the lowest/lower workload in the group of storage devices may be determined, and a free extent may be selected from the determined storage device.

With example implementations of the present disclosure, it may be ensured that the rebuild process of the storage system may work in a way that workloads of the plurality of storage devices are made as balanced as possible. On the one hand, a storage device with a lower workload among the plurality of storage devices may be used to increase response speed, and on the other hand, it may further be ensured wear states of the plurality of storage devices are as consistent as possible.

According to example implementations of the present disclosure, the rebuild operation is supposed to conform to RAID standards. In other words, a plurality of extents in the rebuilt RAID stripe are supposed to reside on different storage devices. Therefore, it should be ensured that the free extent and other extents in the stripe reside on different storage devices, respectively. Specifically, if it is determined that a storage device with a lower workload is different from a storage device where any extent in the stripe resides, then a free extent may be selected from the storage device. With example implementations of the present disclosure, it may be ensured that a plurality of extents in the rebuilt stripe reside on different storage devices.

According to example implementations of the present disclosure, since the generated rebuild parameter may be shared between failed stripes with the same distribution, the rebuild parameter may further be used to rebuild data in other failed stripes with the same distribution. Specifically, a further failed stripe among the plurality of stripes may be determined, here the further failed stripe including a further group of failed extents residing on the group of failed storage devices, and further distribution of the further group of failed extents in the further failed stripe is identical to the distribution of the group of failed extents in the failed stripe. A further group of free extents may be selected from the plurality of storage devices according to the above method, e.g., based on a load balancing principle. Subsequently, data in the further group of failed extents may be rebuilt to the selected further group of free extents based on the stored rebuild parameter.

Figure 6:
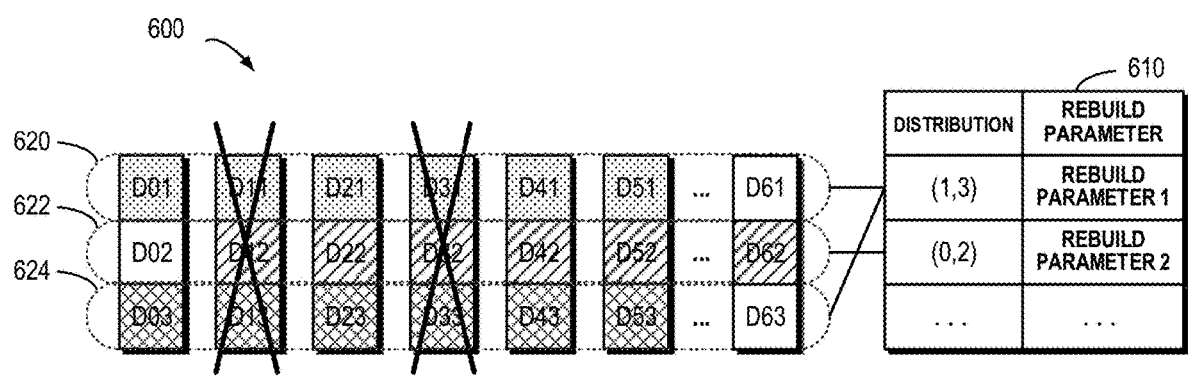
FIG. 6 schematically shows a block diagram of a relationship between a stripe in a storage system and a corresponding rebuild parameter according to example implementations of the present disclosure.

FIG. 6 schematically shows a block diagram 600 of a relationship between a stripe in a storage system and a corresponding rebuild parameter according to example implementations of the present disclosure. As depicted, a plurality of stripes included in the storage system may be processed one by one. Suppose the storage system includes 3 stripes 620, 622 and 624, at which point a corresponding rebuild parameter may be generated or a generated rebuild parameter may be selected, according to the type of distribution of failed extents in each stripe.

As shown in FIG. 6, a rebuild parameter list 610 may be used to store rebuild parameters generated for various types of distribution. First of all, the first stripe 620 is processed. Distribution of the stripe 620 is (1, 3), at which point a corresponding distribution parameter 1 may be generated for the distribution (1, 3). Subsequently, a next stripe 622 is processed, whose distribution is (0, 2). Since the distribution of the stripe 622 is different from that of the stripe 620, a corresponding distribution parameter 2 needs to be generated for the distribution (0, 2). Then, a next stripe 624 is processed, whose distribution is also (1, 3) like the distribution of the stripe 620. Therefore, the rebuild parameter 1 may be reused, and data in the stripe 624 may be rebuilt based on the rebuild parameter 1.

Suppose the storage system includes 10 failed stripes with distribution (1, 3), then an inverse matrix C may be generated only during rebuilding the first failed stripe, and the inverse matrix C may be reused for the following 9 failed stripes. At this point, resource overheads for generating rebuild parameters are reduced to 10% of existing technical solutions. With example implementations of the present disclosure, the efficiency of rebuild operations may be greatly improved.

According to example implementations of the present disclosure, to further improve the performance of rebuild operations, an index may be generated for the rebuild parameter based on the obtained distribution. For example, the index may be generated using locations of failed extents in the stripe as indicated by the distribution. With example implementations of the present disclosure, a corresponding rebuild parameter may be found among a plurality of generated rebuild parameters more quickly, and the performance of rebuild operations may be further improved.

According to example implementations of the present disclosure, index space for generating the index may be determined based on data width and the parity width of the storage system, and the index may be generated in the index space. Here the index space refers to space occupied by the index. Specifically, the size of the index space depends on the number of candidate types of possible distribution of the group of failed extents in the failed stripe.

According to example implementations of the present disclosure, the number of candidate types of distribution of the group of failed extents in the failed stripe may be determined based on the data width and the parity width.

It will be understood that the number of candidate types refers to the number of possible different distributions. For example, regarding a 4D+1P+1Q storage system, its data width is 4 and its parity width is 2. Where two storage devices fail, the two failed storage devices may be any two of the $0^{th}$, $1^{st}$, $2^{nd}$ and $3^{rd}$ storage devices. Therefore, $$C_4^2 = 4 \times \frac{4-1}{2} = 6$$

circumstances might arise. Capacity of the index space may be determined based on the number of the candidate types. Therefore, if a failed stripe in the storage system involves all of 6 circumstances, then 6 rebuild parameters will be generated at the most. At this point, an index may be built for each of the 6 rebuild parameters.

Figure 7:
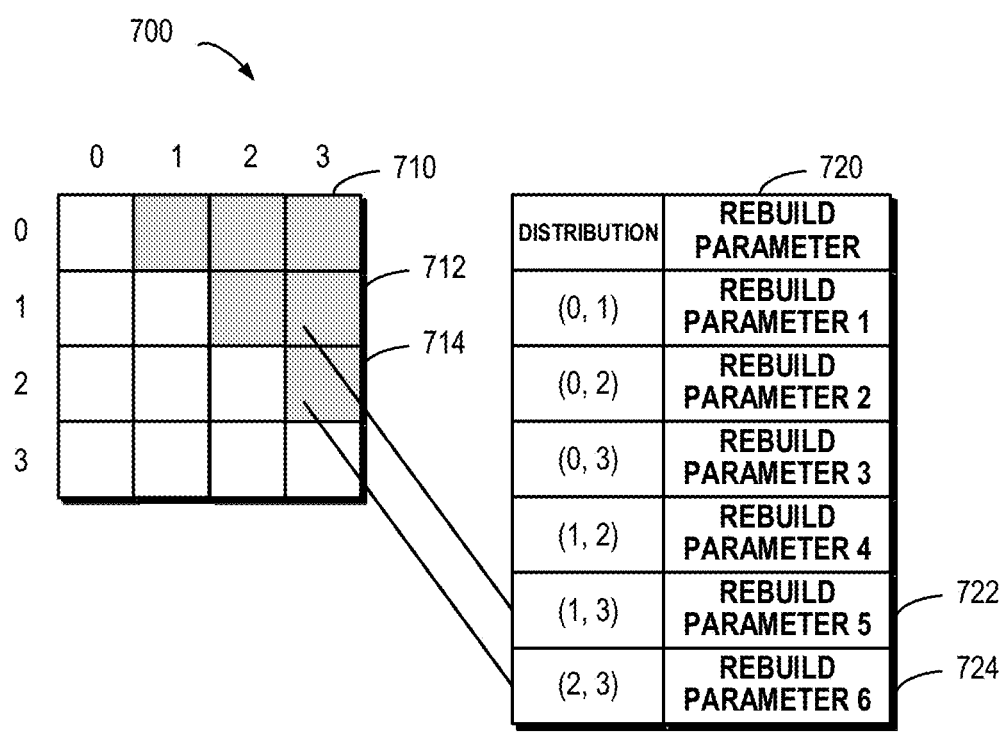
FIG. 7 schematically shows a block diagram of a mapping relation between an index and a rebuild parameter according to example implementations of the present disclosure.

FIG. 7 schematically shows a block diagram 700 of a mapping relationship between an index and a rebuild parameter according to example implementations of the present disclosure. A shaded triangle in the left of FIG. 7 shows the scope of index space. The index space includes 6 indices, and each index may correspond to one rebuild parameter. A rebuild list 710 in the right of FIG. 7 shows 6 possible circumstances of distribution, wherein the first column shows locations of failed extents involved in the distribution. For example, as shown by the second row from the bottom, (1, 3) means failed extents are at the $1^{st}$ and $3^{rd}$ locations in the failed stripe. In another example, as shown by the last row, (2, 3) means failed extents are at the $2^{nd}$ and $3^{rd}$ locations in the failed stripe, respectively.

According to example implementations of the present disclosure, the rebuild parameter may be mapped to an element in the index space, at which point a location of the element in the index space is associated with the distribution of the group of failed extents in the failed stripe. With reference to FIG. 7, a one-to-one mapping relationship between each element (a shaded portion) in the index space and each rebuild parameter in the rebuild list may be built. Take elements 712 and 714 for example. A mapping relationship may be built between the element 712 (at the location (1, 3) in the index space) in the index space and a rebuild parameter 722 in the rebuild list, and a mapping relationship may be built between the element 714 (at the location (2, 3) in the index space) in the index space and a rebuild parameter 724 in the rebuild list. With example implementations of the present disclosure, by generating the index, it is easy to manage rebuild parameters and further improve the performance of rebuild operations.

It will be understood FIG. 7 schematically shows an example of indices according to example implementations of the present disclosure. In other implementations, an index may further be built in another way. For example, suppose two failed extents reside at locations i and j in the failed stripe, then at this point an index may be determined based on Formula 1 below.

$$\text{index}(i, j) = j * \frac{j-1}{2} + i \qquad \text{Formula 1}$$

In Formula 1, both i and j are integers, i<j and i≠j. At this point, regarding the distribution (1, 3) in FIG. 7, the corresponding index (1, 3)=3*(3−1)/2+1=4. At this point, the rebuild parameter 722 will be at a location 4 in the index. In another example, regarding the distribution (2, 3) in FIG. 7, the corresponding index (2, 3) 3*(3−1)/2+2=5. At this point, the rebuild parameter 724 will be at a location 5 in the index. In this way, the complexity of indices may be further simplified, and the rebuild process may be effected with less computing resources and time overheads.

In a more general circumstance, suppose data width of the storage system is n, and parity width is m, then at most $C_n^m$ distribution will arise, at which point integers 0 to $C_n^m-1$ may be used as an index of each rebuild parameter, respectively.

Description has been presented regarding how to generate, store and index rebuild parameters. Where an index has been generated for a rebuild parameter, a corresponding rebuild parameter may be found quickly in the rebuild parameter list 720 by means of the index. According to example implementations of the present disclosure, a rebuild parameter may be searched for in the generated index based on the distribution of the group of failed extents in the failed stripe. Specifically, while rebuilding a certain failed stripe, the distribution (i,j) of the failed stripe may be determined first, and then a corresponding rebuild parameter may be found quickly in the rebuild parameter list based on the distribution (i,j). Continuing the example of FIG. 7, the index element 712 may be found in the index 710 based on the distribution (1, 3), and the failed stripe may be recovered using the rebuild parameter that is in a mapping relationship with the index element 712.

According to example implementations of the present disclosure, the above method 500 may be performed when a failed storage device appears in the storage system. In the initial stage of the method 500, the rebuild parameter list is empty, and as failed stripes with different distribution are discovered continuously, different rebuild parameters are generated gradually. Generated rebuild parameters may be added to the rebuild parameter list one by one, and indices may be built.

Figure 8:
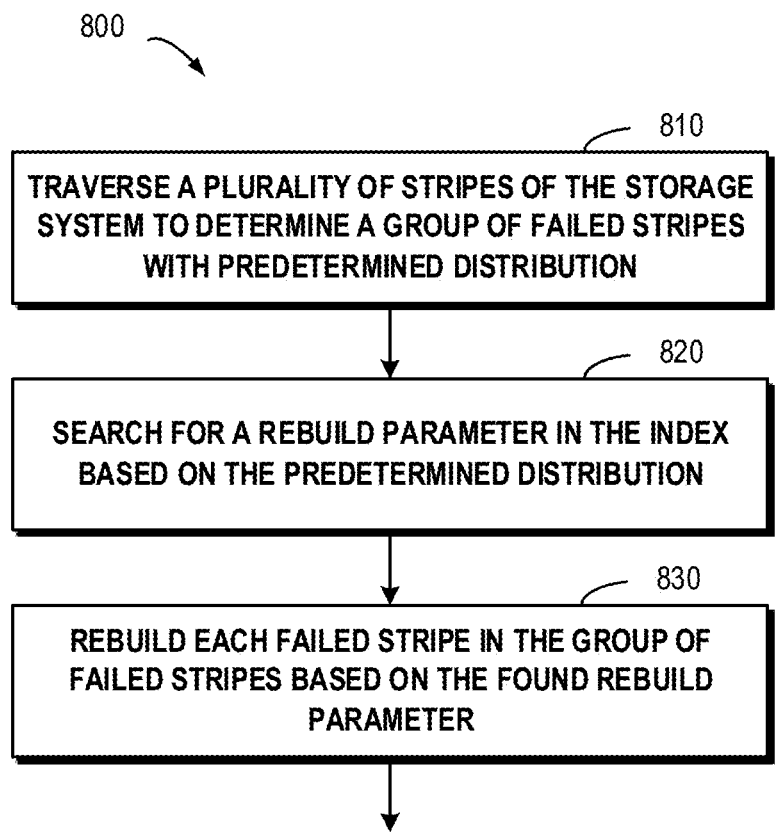
FIG. 8 schematically shows a flowchart of a method for rebuilding a stripe in a storage system according to example implementations of the present disclosure.

FIG. 8 schematically shows a flowchart of a method 800 for rebuilding a stripe in a storage system according to example implementations of the present disclosure. As depicted, at block 810, a plurality of stripes in the storage system may be traversed to determine a group of failed stripes with predetermined distribution. For example, the process shown at block 810 may be performed each time a new rebuild parameter is generated for a failed stripe with the predetermined distribution. At block 820, a rebuild parameter may be searched for in the index based on the predetermined distribution. Specifically, the search may be carried out in the rebuild parameter list based on the above method. Then at block 830, each failed stripe in the group of failed stripes determined at block 810 may be rebuilt based on the found rebuild parameter.

Figure 9:
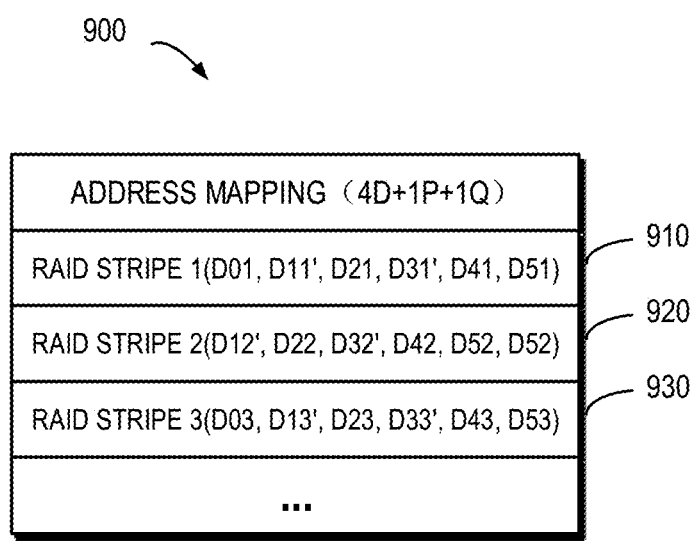
FIG. 9 schematically shows a block diagram of a rebuilt storage system according to example implementations of the present disclosure.

It will be understood that after the rebuild operation is performed, extents comprised in the stripe will change, so the address mapping needs to be updated based on extents currently comprised in the RAID stripe. FIG. 9 schematically shows a block diagram 900 of an address mapping of a rebuilt storage system according to example implementations of the present disclosure. Suppose extents D11 and D31 in RAID stripe 1 have been replaced with extents D11' and D31', at which point RAID stripe 1 in the updated address mapping will include an extent denoted by a reference numeral 910. Suppose extents D12 and D32 in RAID stripe 2 have been replaced with extents D12' and D32', at which point RAID stripe 2 in the updated address mapping will include an extent denoted by a reference numeral 920. Suppose extents D13 and D33 in RAID stripe 3 have been replaced with extents D13' and D33', at which point RAID stripe 3 in the updated address mapping will include an extent denoted by a reference numeral 930.

With example implementations of the present disclosure, the updated address mapping may reflect the latest mapping relationships between various RAID stripes and extents in the storage system. Subsequent data read requests and data write requests may be served based on the updated address mapping.

It will be understood that although implementations for managing a storage system have been described by taking a 4D+1P+1Q storage system as an example, in other implementations the storage system may further be a RAID-6 storage system with another data width. For example, the storage system may be an 8D+1P+1Q, 16D+1P+1Q storage system. In another example, the storage system may further be a storage system with another parity width.

With example implementations of the present disclosure, when the number of failed storage devices is no more than the parity width of the storage system, a rebuild parameter may be shared between failed stripes with the same distribution. In this way, computing resources and time overheads for generating rebuild parameters may be reduced, and further the rebuild efficiency may be improved.

While examples of the method according to the present disclosure have been described in detail with reference to FIGS. 2 to 9, description is presented below for the implementation of a corresponding apparatus. According to example implementations of the present disclosure, an apparatus is provided for managing a storage system. The storage system includes a plurality of stripes, a plurality of extents comprised in one stripe among the plurality of stripes residing on a plurality of storage devices in the storage system, respectively. The apparatus includes: a determining module configured to determine a failed stripe among the plurality of stripes, the failed stripe including a group of failed extents residing on a group of failed storage devices, respectively, a number of failed storage devices in the group being less than or equal to parity width of the storage system; an obtaining module configured to obtain a distribution of the group of failed extents in the failed stripe; a generating module configured to generate a rebuild parameter for rebuilding data in the failed stripe based on the obtained distribution; and a storage module configured to store the generated rebuild parameter for rebuilding the storage system.

According to example implementations of the present disclosure, the storage module includes: an index module configured to generate an index for the rebuild parameter based on the obtained distribution.

According to example implementations of the present disclosure, the index module includes: a space determining module configured to determine index space for generating the index based on data width and the parity width of the storage system; and an index generating module configured to generate the index in the index space.

According to example implementations of the present disclosure, the space determining module includes: a number determining module configured to determine a number of candidate types of distribution of the group of failed extents in the failed stripe based on the data width and the parity width; and a capacity determining module configured to determine capacity of the index space based on the number of the candidate types.

According to example implementations of the present disclosure, the index generating module includes: a mapping module configured to map the rebuild parameter to an element in the index space, a location of the element in the index space being associated with the distribution of the group of failed extents in the failed stripe.

According to example implementations of the present disclosure, further comprised are: a selecting module configured to select a group of free extents from a group of normal storage devices other than the group of failed storage devices among the plurality of storage devices; and a rebuilding module configured to rebuild data in the group of failed extents to the selected group of free extents based on the stored rebuild parameter.

According to example implementations of the present disclosure, the selecting module includes: a load module configured to determine workloads of the group of normal storage devices; an extent selecting module configured to select the group of free extents from the group of normal storage devices based on the determined workloads.

According to example implementations of the present disclosure, the determining module is further configured to determine a further failed stripe among the plurality of stripes, the further failed stripe including a further group of failed extents residing in the group of failed storage devices, further distribution of the further group of failed extents in the further failed stripe being identical to the distribution of the group of failed extents in the failed stripe; the selecting module is further configured to select a further group of free extents from the plurality of storage devices; and the rebuilding module is further configured to rebuild data in the further group of failed extents to the selected further group of free extents based on the stored rebuild parameter.

According to example implementations of the present disclosure, the apparatus further includes a search module configured to obtain the rebuild parameter in the generated index based on the distribution of the group of failed extents in the failed stripe.

According to example implementations of the present disclosure, the storage system is a storage system based on a Redundant Array of Independent Disks, and the parity width of the storage system includes 2.

Figure 10:
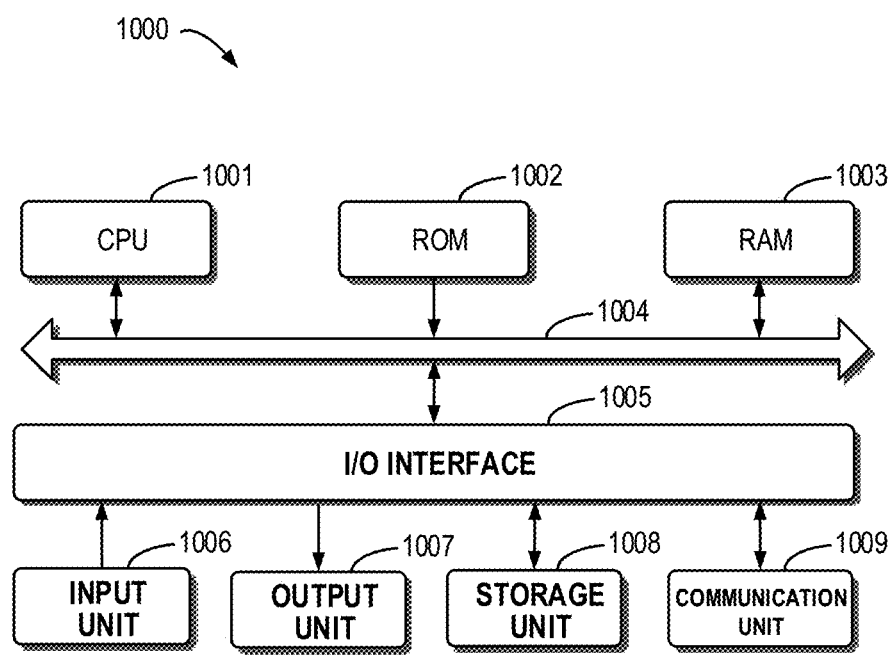
FIG. 10 schematically shows a block diagram of a device for managing a storage system according to example implementations of the present disclosure.

FIG. 10 schematically shows a block diagram of a device 1000 for managing a storage system according to example implementations of the present disclosure. As depicted, the device 1000 includes a central processing unit (CPU) 1001, which can execute various suitable actions and processing based on the computer program instructions stored in the read-only memory (ROM) 1002 or computer program instructions loaded in the random-access memory (RAM) 1003 from a storage unit 1008. The RAM 1003 can also store all kinds of programs and data required by the operations of the device 1000. CPU 1001, ROM 1002 and RAM 1003 are connected to each other via a bus 1004. The input/output (I/O) interface 1005 is also connected to the bus 1004.

A plurality of components in the device 1000 are connected to the I/O interface 1005, including: an input unit 1006, such as a keyboard, mouse and the like; an output unit 1007, e.g., various kinds of displays and loudspeakers etc.; a storage unit 1008, such as a magnetic disk and optical disk, etc.; and a communication unit 1009, such as a network card, modem, wireless transceiver and the like. The communication unit 1009 allows the device 1000 to exchange information/data with other devices via the computer network, such as Internet, and/or various telecommunication networks.

The above described process and treatment, such as the methods 500 and 800 can also be executed by the processing unit 1001. For example, in some implementations, the methods 500 and 800 can be implemented as a computer software program tangibly included in the machine-readable medium, e.g., the storage unit 1008. In some implementations, the computer program can be partially or fully loaded and/or mounted to the device 1000 via ROM 1002 and/or the communication unit 1009. When the computer program is loaded to the RAM 1003 and executed by the CPU 1001, one or more steps of the above described methods 500 and 800 can be implemented. Alternatively, in other implementations, the CPU 1101 also can be configured in other suitable manners to realize the above procedure/method.

According to example implementations of the present disclosure, a device is provided for managing a storage system. The storage system includes a plurality of stripes, a plurality of extents comprised in one stripe among the plurality of stripes residing on a plurality of storage devices in the storage system, respectively. The device includes: at least one processor; and a memory coupled to the at least one processor, the memory having instructions stored thereon, the instructions, when executed by the at least one processor, causing the device to perform acts. The acts include: determining a failed stripe among the plurality of stripes, the failed stripe including a group of failed extents residing on a group of failed storage devices, respectively, a number of failed storage devices in the group being less than or equal to parity width of the storage system; obtaining distribution of the group of failed extents in the failed stripe; generating a rebuild parameter for rebuilding data in the failed stripe based on the obtained distribution; and storing the generated rebuild parameter for rebuilding the storage system.

According to example implementations of the present disclosure, storing the generated rebuild parameter for rebuilding the storage system includes: generating an index for the rebuild parameter based on the obtained distribution.

According to example implementations of the present disclosure, generating the index for the rebuild parameter based on the obtained distribution includes: determining index space for generating the index based on data width and the parity width of the storage system; and generating the index in the index space.

According to example implementations of the present disclosure, determining index space for generating the index includes: determining a number of candidate types of the distribution of the group of failed extents in the failed stripe based on the data width and the parity width; and determining capacity of the index space based on the number of the candidate types.

According to example implementations of the present disclosure, generating the index in the index space includes: mapping the rebuild parameter to an element in the index space, a location of the element in the index space being associated with the distribution of the group of failed extents in the failed stripe.

According to example implementations of the present disclosure, the acts further include: selecting a group of free extents from a group of normal storage devices other than the group of failed storage devices among the plurality of storage devices; and rebuilding data in the group of failed extents to the selected group of free extents based on the stored rebuild parameter.

According to example implementations of the present disclosure, selecting the group of free extents from the group of normal storage devices other than the group of failed storage devices among the plurality of storage devices includes: determining workloads of the group of normal storage devices; selecting the group of free extents from the group of normal storage devices based on the determined workloads.

According to example implementations of the present disclosure, the acts further include: determining a further failed stripe among the plurality of stripes, the further failed stripe including a further group of failed extents residing in the group of failed storage devices, respectively, further distribution of the further group of failed extents in the further failed stripe being identical to the distribution of the group of failed extents in the failed stripe; selecting a further group of free extents from the plurality of storage devices; and rebuilding data in the further group of failed extents to the selected further group of free extents based on the stored rebuild parameter.

According to example implementations of the present disclosure, the acts further include: obtaining the rebuild parameter in the generated index based on the distribution of the group of failed extents in the failed stripe.

According to example implementations of the present disclosure, the storage system is a storage system based on a Redundant Array of Independent Disks, and the parity width of the storage system includes 2.

According to example implementations of the present disclosure, there is provided a computer program product. The computer program product is tangibly stored on a non-transitory computer-readable medium and includes machine-executable instructions which are used to implement the method according to the present disclosure.

According to example implementations of the present disclosure, there is provided a computer-readable medium. The computer-readable medium has machine-executable instructions stored thereon, the machine-executable instructions, when executed by at least one processor, causing the at least one processor to implement the method according to the present disclosure.

The present disclosure can be a method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, an electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instructions can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combination of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on a remote computer, or completely on the remote computer or server. In the case where a remote computer is involved, the remote computer can be connected to the user computer via any type of network, including local area network (LAN) and wide area network (WAN), or to the external computer (e.g., connected via Internet using an Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow charts and/or block diagrams of method, apparatus (system) and computer program products according to implementations of the present disclosure. It should be understood that each block of the flow charts and/or block diagrams and the combination of various blocks in the flow charts and/or block diagrams can be implemented by computer-readable program instructions.

The computer-readable program instructions can be provided to the processing unit of a general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, the other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow charts and block diagrams in the drawings illustrate system architecture, functions and operations that may be implemented by system, method and computer program products according to a plurality of implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order depending on the functions involved. It should also be noted that each block in the block diagram and/or flow chart and combinations of the blocks in the block diagram and/or flow chart can be implemented by a hardware-based system exclusively for executing stipulated functions or actions, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable others of ordinary skill in the art to understand implementations of the present disclosure.

We claim:

1. A method for managing a storage system, the storage system comprising a plurality of stripes, a plurality of extents comprised in one stripe among the plurality of stripes residing on a plurality of storage devices in the storage system, respectively, the method comprising:

determining a failed stripe among the plurality of stripes, the failed stripe comprising a plurality of failed extents residing on a plurality of failed storage devices, respectively, wherein a number of the plurality of failed storage devices is less than or equal to a parity width of the storage system;

obtaining a distribution of the plurality of failed extents in the failed stripe;

generating a rebuild parameter for rebuilding data in the failed stripe based on the obtained distribution;

storing the generated rebuild parameter for rebuilding the storage system, wherein storing the generated rebuild parameter for rebuilding the storage system comprises generating an index for the rebuild parameter based on the obtained distribution;

selecting a plurality of free extents from the plurality of storage devices;

rebuilding data in the plurality of failed extents to the selected plurality of free extents based on the stored rebuild parameter;

determining a further failed stripe among the plurality of stripes, the further failed stripe comprising a further plurality of failed extents residing in the plurality of failed storage devices, respectively, wherein a further distribution of the further plurality of failed extents in the further failed stripe is identical to the distribution of the plurality of failed extents in the failed stripe;

selecting a further plurality of free extents from the plurality of storage devices; and rebuilding data in the further plurality of failed extents to the selected further plurality of free extents based on the stored rebuild parameter.

2. The method of claim 1, wherein generating the index for the rebuild parameter based on the obtained distribution comprises:

determining index space for generating the index based on data width and the parity width of the storage system; and generating the index in the index space.

3. The method of claim 2, wherein determining the index space for generating the index comprises:

determining a number of candidate types of the distribution of the plurality of failed extents in the failed stripe based on the data width and the parity width; and determining capacity of the index space based on the number of the candidate types.

4. The method of claim 2, wherein generating the index in the index space comprises:

mapping the rebuild parameter to an element in the index space, a location of the element in the index space being associated with the distribution of the plurality of failed extents in the failed stripe.

5. The method of claim 1, wherein selecting the plurality of free extents from the plurality of storage devices comprises:

selecting the group of free extents from a plurality of normal storage devices other than the plurality of failed storage devices among the plurality of storage devices;

determining workloads of the plurality of normal storage devices; and selecting the plurality of free extents from the plurality of normal storage devices based on the determined workloads.

6. The method of claim 1, further comprising:

obtaining the rebuild parameter in the generated index based on the distribution of the plurality of failed extents in the failed stripe.

7. The method of claim 1, wherein the storage system is a storage system based on a Redundant Array of Independent Disks, and the parity width of the storage system is 2.

8. The method of claim 1:

wherein each of the plurality of stripes includes exactly n data extents and m parity extents, n being greater than 2 and m being equal to the parity width of the storage system, the parity width of the storage system being at least 2, the m parity extents providing redundancy to protect integrity of the n data extents;

wherein obtaining the distribution of the plurality of failed extents in the failed stripe includes determining numbering of the failed extents within the failed stripe, the extents within each stripe having a pre-established numbering;

wherein generating the rebuild parameter includes generating a matrix as the rebuild parameter using the determined numbering of the failed extents within the failed stripe;

wherein storing the generated rebuild parameter includes (a) determining the index for the rebuild parameter based on the determined numbering of the failed extents within the failed stripe and (b) storing the determined index in connection with the generated matrix; and wherein the method further comprises:

deriving a further index from the further distribution of the further plurality of failed extents in the further failed stripe, the further index being equal to the determined index;

obtaining the matrix from storage using the further index; and rebuilding both the failed stripe and the further failed stripe using the matrix.

9. A device for managing a storage system, the storage system comprising a plurality of stripes, a plurality of extents comprised in one stripe among the plurality of stripes residing on a plurality of storage devices in the storage system, respectively, the device comprising:

at least one processor; and a memory coupled to the at least one processor and having instructions stored thereon, the instructions, when executed by the at least one processor, causing the device to perform acts, including:

determining a failed stripe among the plurality of stripes, the failed stripe comprising a plurality of failed extents residing on a plurality of failed storage devices, respectively, wherein a number of the plurality of failed storage devices is less than or equal to a parity width of the storage system;

obtaining a distribution of the plurality of failed extents in the failed stripe;

generating a rebuild parameter for rebuilding data in the failed stripe based on the obtained distribution;

storing the generated rebuild parameter for rebuilding the storage system, wherein storing the generated rebuild parameter for rebuilding the storage system comprises generating an index for the rebuild parameter based on the obtained distribution;

selecting a plurality of free extents from the plurality of storage devices;

rebuilding data in the plurality of failed extents to the selected plurality of free extents based on the stored rebuild parameter;

determining a further failed stripe among the plurality of stripes, the further failed stripe comprising a further plurality of failed extents residing in the plurality of failed storage devices, respectively, wherein a further distribution of the further plurality of failed extents in the further failed stripe is identical to the distribution of the plurality of failed extents in the failed stripe;

selecting a further plurality of free extents from the plurality of storage devices; and rebuilding data in the further plurality of failed extents to the selected further plurality of free extents based on the stored rebuild parameter.

10. The device of claim 9, wherein generating the index for the rebuild parameter based on the obtained distribution comprises:
   determining index space for generating the index based on data width and the parity width of the storage system; and
   generating the index in the index space.

11. The device of claim 10, wherein determining index space for generating the index comprises:
   determining a number of candidate types of the distribution of the plurality of failed extents in the failed stripe based on the data width and the parity width; and
   determining capacity of the index space based on the number of the candidate types.

12. The device of claim 10, wherein generating the index in the index space comprises:
   mapping the rebuild parameter to an element in the index space, a location of the element in the index space being associated with the distribution of the plurality of failed extents in the failed stripe.

13. The device of claim 9, wherein selecting the plurality of free extents from the plurality of storage devices comprises:
   selecting a group of free extents from a plurality of normal storage devices other than the plurality of failed storage devices among the plurality of storage devices;
   determining workloads of the plurality of normal storage devices; and
   selecting the plurality of free extents from the plurality of normal storage devices based on the determined workloads.

14. The device of claim 9, wherein the acts further comprise:
   obtaining the rebuild parameter in the generated index based on the distribution of the plurality of failed extents in the failed stripe.

15. A computer program product having a non-transitory computer readable medium which stores a set of instructions to manage a storage system comprising a plurality of stripes, a plurality of extents comprised in one stripe among the plurality of stripes residing on a plurality of storage devices in the storage system, respectively; the set of instructions, when carried out by computerized circuitry, causing the computerized circuitry to perform a method of:
   determining a failed stripe among the plurality of stripes, the failed stripe comprising a plurality of failed extents residing on a plurality of failed storage devices, respectively, wherein a number of the plurality of failed storage devices is less than or equal to a parity width of the storage system;
   obtaining a distribution of the plurality of failed extents in the failed stripe;
   generating a rebuild parameter for rebuilding data in the failed stripe based on the obtained distribution;
   storing the generated rebuild parameter for rebuilding the storage system, wherein storing the generated rebuild parameter for rebuilding the storage system comprises generating an index for the rebuild parameter based on the obtained distribution;
   selecting a plurality of free extents from the plurality of storage devices;
   rebuilding data in the plurality of failed extents to the selected plurality of free extents based on the stored rebuild parameter;
   determining a further failed stripe among the plurality of stripes, the further failed stripe comprising a further plurality of failed extents residing in the plurality of failed storage devices, respectively, wherein a further distribution of the further plurality of failed extents in the further failed stripe is identical to the distribution of the plurality of failed extents in the failed stripe;
   selecting a further plurality of free extents from the plurality of storage devices; and
   rebuilding data in the further plurality of failed extents to the selected further plurality of free extents based on the stored rebuild parameter.

\* \* \* \* \*